United States Patent

Inata et al.

[11] Patent Number: 6,146,557
[45] Date of Patent: Nov. 14, 2000

[54] FIRE RESISTANT RESIN COMPOSITION

[75] Inventors: Hitoshi Inata, Tokuyama; Haruyuki Ishida, Shinnanyo; Tetsuo Kuwaki, Tokuyama, all of Japan

[73] Assignee: Tokuyama Corporation, Yamaguchi-ken, Japan

[21] Appl. No.: 09/073,063

[22] Filed: May 6, 1998

[30] Foreign Application Priority Data

May 9, 1997 [JP] Japan .................................. 9-119622

[51] Int. Cl.$^7$ ............................ C09K 21/00; C09D 5/14; C09D 5/18
[52] U.S. Cl. ...................... 252/609; 524/400; 106/15.05; 106/18; 106/18.14; 106/18.15; 106/18.16
[58] Field of Search ........................... 524/400; 252/609; 106/15.05, 18, 18.14, 18.15, 18.16

[56] References Cited

U.S. PATENT DOCUMENTS

| | | | |
|---|---|---|---|
| 4,026,810 | 5/1977 | Bost | 252/8.1 |
| 4,729,853 | 3/1988 | von Bonin | 252/601 |
| 4,873,116 | 10/1989 | Ancker | 428/36.9 |
| 4,992,481 | 2/1991 | von Bonin et al. | 521/54 |
| 5,206,284 | 4/1993 | Fukui et al. | 524/504 |
| 5,344,866 | 9/1994 | Hall | 524/450 |

FOREIGN PATENT DOCUMENTS

| | | |
|---|---|---|
| 0035417 | 9/1981 | European Pat. Off. . |
| 2551718 | 6/1977 | Germany . |
| 8-48812 | 2/1996 | Japan . |
| 8-81583 | 3/1996 | Japan . |

OTHER PUBLICATIONS

Database WPI Section Ch, Week 8727, Derwent Publications Ltd., London, GB; Class A25, AN 87–188042, XP002082969 & JP 62 116635 A (Nisshin Spinning Co Ltd) May 28, 1987.

*Primary Examiner*—Maureen M. Wallenhorst
*Assistant Examiner*—Monique T. Cole
*Attorney, Agent, or Firm*—Wenderoth, Lind & Ponack, L.L.P.

[57] ABSTRACT

Provided is a fire resistant resin composition comprising 100 parts by weight of a thermoplastic resin (I) such as a polyolefin base resin, 10 to 300 parts by weight of at least one flame retardant (II) selected from the group consisting of a nitrogen base flame retardant having no halogen atoms such as an aliphatic amine compound (a) and a triazine compound, a phosphorus base flame retardant having no halogen atoms such as a simple substance (b) of phosphorus, phosphates and polyphosphates and a nitrogen·phosphorus base flame retardant having no halogen atom such as a phosphate of an aliphatic amine compound (c), a polyphosphate of an aliphatic amine compound, a phosphate of a triazine compound and a polyphosphate of a triazine compound, and 1 to 100 parts by weight of phyllosilicate hydrate (III). This fire resistant resin composition can suitably be used for production of parts and covers of various electric appliances and heating equipments, production of interior materials and exterior materials for buildings, and production of parts and interior materials for automobiles, marine vessels and aircrafts.

10 Claims, No Drawings

FIRE RESISTANT RESIN COMPOSITION

BACKGROUND OF THE INVENTION

1. Field of the Invention

The present invention relates to a fire resistant resin composition which has less toxicity and does not damage the properties of resins.

2. Description of the Related Art

Thermoplastic resins have a property that they are easy to ignite and burn. This makes it impossible to use them as they are for uses in which it is inconvenient if they burn. Accordingly, various flameproof means are provided.

In general, thermoplastic resins are flame-proofed by blending various flame retardants. Flame retardants are divided roughly into halogen base flame retardants and non-halogen base flame retardants.

In the halogen base flame retardants, toxicity provided by acidic gas such as hydrogen bromide and hydrogen chloride produced in burning has so far been pointed out. Further, in recent years, it is regarded as a problem that there is a risk that dioxin is produced. Accordingly, attention is paid on non-halogen base flame retardants.

The non-halogen base flame retardants include, for example, metal hydroxides such as magnesium hydroxide. They have the problem that the fire resistant performance is inferior while gases produced in burning have a low toxicity as compared with halogen base flame retardants. Accordingly, in order to make thermoplastic resins fire resistant using magnesium hydroxide, it has to be blended into the resins in a large amount, and therefore the problem that the properties of the resins are damaged is caused.

Taking such background into account, the present inventors proposed previously a fire resistant composition obtained by blending a thermoplastic resin with a sulfate of a triazine compound as a non-halogen base flame retardant (Japanese Laid-Open Publication 48812/1996). Further, a fire resistant reinforced resin composition prepared by blending a thermoplastic resin with vermiculite and glass fibers is disclosed in U.S. Pat. No. 5344866. However, these compositions show a considerable fire resistant effect but the fire resistance is not satisfactory, and compositions having better fire resistance have been expected to be developed.

Further, in order to achieve a high-degree fire resistance of V-0 prescribed in UL94 Standard, the present inventors proposed a composition obtained by blending a thermoplastic resin with a sulfate of a triazine compound and thermally expandable graphite (Japanese Laid-Open Publication 81583/1996). However, this composition had the problem that it was colored black by thermally expandable graphite and could not variously be colored. Further involved was the problem that when thermally expandable graphite was blended after pulverized into fine grains in order to improve an appearance of the molded article, the thermal expanding property was lost and the sufficient fire resistance could not be obtained.

Accordingly, in a fire resistant resin composition prepared by blending a thermoplastic resin with a non-halogen base flame retardant, it has been a subject to develop a composition which has a high-degree fire resistance and is excellent in a color tone.

SUMMARY OF THE INVENTION

An object of the present invention is to provide a novel fire resistant resin composition.

Further, an object of the present invention is to provide a fire resistant resin composition prepared by blending a thermoplastic resin with a non-halogen base flame retardant, which has a high-degree fire resistance.

Still further, an object of the present invention is to provide a highly practical fire resistant resin composition which is excellent in a color tone and has a high-degree fire resistance.

These objects of the present invention can be achieved by a fire resistant resin composition comprising 100 parts by weight of a thermoplastic resin (I), 10 to 300 parts by weight of at least one flame retardant (II) selected from the group consisting of a nitrogen base flame retardant having no halogen atoms, a phosphorus base flame retardant having no halogen atoms and a nitrogen-phosphorus base flame retardant having no halogen atoms, and 1 to 100 parts by weight of phyllosilicate hydrate (III).

DETAILED DESCRIPTION OF THE INVENTION

Known resins can be used as the thermoplastic resin (I) used in the present invention without providing specific limitations. Examples thereof include thermoplastic resins such as polyolefin base resins, polystyrene base resins, polyvinyl base resins, polyamide base resins, polyester base resins, polycarbonate resins and polyether base resins, and various resins obtained by modifying these resins.

There can be given as the polyolefin base resins, homopolymers of α-olefins such as ethylene, propylene, butene, hexene, 4-methylpentene and octene, and copolymers of two or more kinds of α-olefins. Specific examples of the typical polyolefin base resins in the present invention include polypropylene base resins such as propylene homopolymers, propylene-ethylene random copolymers and propylene-ethylene block copolymers; and polyethylene base resins such as low density polyethylene, high density polyethylene, ethylene-α-olefin random copolymers and propylene-ethylene-butene copolymers.

The polystyrene base resins include polystyrene, acrylonitrile-styrene copolymers (AS) and acrylonitrile-butadiene-styrene copolymers (ABS).

The polyvinyl base resins include homopolymers of vinyl monomers such as alkyl acrylate, alkyl methacrylate, vinyl acetate and vinyl alcohol, and copolymers of these vinyl monomers with the α-olefins described above.

Further, the polyamide base resins include nylon 6 and nylon 66, and the polyester base resins include polyalkene terephthalates represented by polyethylene terephthalate (PET) and polybutylene terephthalate (PBT); polyalkene adipate; polylactone; and polyhydroxycarbonate.

The polycarbonate base resins include resins comprising aromatic carbonic esters as a structural unit, such as poly-4,4'-dioxydipheny-2,2-propanecarbonate, and the polyether base resins include polyphenylene ether and polyethylene ether.

In the present invention, these thermoplastic resins may be either or both of a plastomer and an elastomer. The elastomer includes, for example, ethylene-propylene-butadiene copolymers, styrene-butadiene copolymers (SBR), nitrile-butadiene copolymers (NBR), polybutadiene and polyisoprene.

These thermoplastic resins can be used alone or in a mixture of two or more kinds thereof. Further, there can be used as well modified matters of the thermoplastic resins described above, for example, modified matters obtained by grafting the above thermoplastic resins with unsaturated carboxylic acids such as acrylic acid, methacrylic acid, maleic acid, fumaric acid, maleic anhydride and itaconic anhydride and siloxane.

Among the thermoplastic resins described above, the polyolefin base resins are preferred because of the reason that they are of general purposes and provide molded articles which are excellent in a chemical resistance and a fire resistance. In particular, the polypropylene base resins such as propylene homopolymers,-propylene-ethylene random copolymers and propylene-ethylene block copolymers are preferred in the present invention since the fire resistant resin compositions of the present invention obtained by using them provide molded articles which are excellent in moldability, mechanical strength, appearance and cost performance.

In the fire resistant resin composition of the present invention, the thermoplastic resin (I) described above is blended with at least one flame retardant (II) selected from the group consisting of a nitrogen base flame retardant having no halogen atom, a phosphorus base flame retardant having no halogen atom and a nitrogen-phosphorus base flame retardant having no halogen atom. All of the nitrogen base flame retardant, the phosphorus base flame retardant and the nitrogen-phosphorus base flame retardant have no halogen atoms in molecules thereof.

The nitrogen base flame retardant described above is subjected to endothermic decomposition when the blended resin is exposed to high temperatures to form an inert atmosphere and to absorb heat from the resin, whereby a fire resistant effect is shown. Among them, preferred is the product which absorbs a heat of 50 mJ or more, particularly 150 mJ or more per mg in decomposition in differential thermal analysis. Known products can be used as such nitrogen base flame retardant without limitations, and examples thereof include aliphatic amine compounds, aromatic amine compounds, nitrogen-containing heterocyclic compounds, cyan compounds, aliphatic amides, aromatic amides, urea and thiourea.

The aliphatic amine compounds described above can be represented by the following formula:

$$H_2N—R—(NH—R)_n—A$$

wherein a plurality of R is an alkylene group or a cycloalkylene group which may be the same as or different from each other; A is hydrogen or an amino group; and n is an integer of 0 to 5. The alkylene group is preferably an alkylene group having 1 to 8 carbon atoms, for example, methylene, ethylene, trimethylene, tetramethylene, pentamethylene, hexamethylene, heptamethylene, octamethylene, propylene, butylene, hexylene and octylene. The cycloalkylene group is preferably a cycloalkylene group having 5 to 8 carbon atoms, for example, a cyclohexane-1,2-diyl group and a cyclooctane-1,2-diyl group.

Specific examples of such aliphatic amine compounds include ethylamine, butylamine, diethylamine, ethylenediamine, butylenediamine, triethylenetetramine, 1,2-diaminocyclohexane and 1,2-diaminocyclooctane.

The aromatic amine compounds described above include aniline and phenylenediamine. The nitrogen-containing heterocyclic compounds include uric acid, adenine, guanine, 2,6-diaminopurine, 2,4,6-triaminopyridine and triazine compounds, and the cyan compounds include dicyndiamide. The aliphatic amides include N,N-dimethylacetoamide, and the aromatic amides include N,N-diphenylacetoamide.

The triazine compounds given as the example of the nitrogen-containing heterocyclic compound described above is a nitrogen-containing heterocyclic compound having a triazine skeleton and can be represented by the following formula:

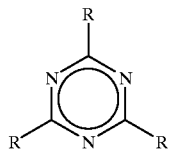

wherein a plurality of R is hydrogen, an alkyl group, an aryl group, an amino group, a hydroxyl group, an alkoxy group or a mercapto group which may be the same as or different from each other.

The alkyl group is preferably an alkyl group having 1 to 4 carbon atoms, for example, methyl, ethyl, propyl and butyl, and the aryl group includes an aryl group having 6 to 10 carbon atoms, for example, phenyl, tolyl, xylyl and naphthyl. The alkoxy group is preferably an alkoxy group having 1 to 4 carbon atoms, for example, methoxy, ethoxy, propoxy and butoxy.

Specific examples of the triazine compounds include triazine, melamine, benzoguanamine, methylguanamine, cyanuric acid, trimethyltriazine, triphenyltriazine, amerine, ameride, thiocyanuric acid, diaminomercaptotriazine, diaminomethyltriazine, diaminophenyltriazine and diaminoisopropoxytriazine.

In the present invention, salts of the respective compounds described above can also be used as the nitrogen base flame retardant. The salts thereof include sulfates, nitrates, borates and isocyanurates.

Among the nitrogen base flame retardants, the aliphatic amine compounds, the triazine compounds and the salts thereof can particularly suitably be used in the present invention because these compounds display an excellent fire resistant effect.

The phosphorus base flame retardants are considered to show a fire resistant effect by producing polyphosphoric acid compounds when the blended resin is exposed to high temperatures to form heat resistant coatings or by virtue of a carbonization-accelerating mechanism attributable to a solid acid. Known products can be used as such phosphorus base flame retardants without limitations, and specific examples thereof include a simple substance of phosphorus such as red phosphorus; phosphates such as calcium phosphate and titanium phosphate; phosphoric esters such as tributyl phosphate and triphenyl phosphate; polyphosphoric acid; polyphosphates such as calcium polyphosphate; polyphosphoric esters such as poly(diphenylphosphoric acid); phosphine oxides such as triphenylphosphine oxide; phosphoranes such as phenylphosphorane; phosphonic acids such as diphenylphosphonic acid; and phosphine sulfides.

Among them, a simple substance of phosphorus, phosphates and polyphosphates can suitably be used because of a large fire resistant effect.

Further, in the present invention, the nitrogen-phosphorus base flame retardants having both a nitrogen atom and a phosphorus atom in a molecule can be used as a compound having altogether the functions of the nitrogen base flame retardant and the phosphorus base flame retardant each described above. The resin composition having a particularly excellent fire resistance can be obtained by using such flame retardants. Such flame retardants include phosphates and polyphosphates of the respective compounds given as the examples of the nitrogen base flame retardants described above; phosphazene compounds such as propoxyphosphazene, phenoxyphosphazene, methylphenoxyphosphazene and aminophosphazene; phosphoric amides such as N,N-diethylphosphamide; and polyphosphoric amides such as poly(N,N-diethylphosphamide). In particular, phosphates and polyphosphates of the aliphatic amine compounds represented by the formula described above and phosphates and polyphosphates of the triazine compounds represented by the formula described above can suitably be used in the present invention because of a large fire resistant effect. In addition thereto, ammonium phosphate and ammonium polyphosphate can suitably be used.

Specific examples of the nitrogen-phosphorus base flame retardants capable of being suitably used in the present invention include ammonium phosphate, ethylenediamine phosphate, melamine phosphate, ammonium polyphosphate and ethylenediamine polyphosphate.

The nitrogen-phosphorus base flame retardants described above can be used alone or in a mixture of two or more kinds thereof.

In the present invention, the blend amount of the nitrogen base flame retardant, the phosphorus base flame retardant or the nitrogen-phosphorus base flame retardant each described above is 10 to 300 parts by weight, preferably 25 to 250 parts by weight per 100 parts by weight of the thermoplastic resin. If the blend amount is less than 10 parts by weight, the sufficient fire resistant effect is not obtained. On the other hand, if the blend amount is more than 300 parts by weight, brought about the disadvantages that not only the moldability and the impact resistance are reduced and the specific gravity grows large but also the stable kneading work becomes difficult.

The fire resistant resin composition of the present invention is further blended with the phyllosilicate hydrate (III). In phyllosilicate hydrate, tetrahedrons of Si—O in silicate are combined with each other to form a layer structure, and this is a structural base for the phyllosilicate. Accordingly, it has a property that it contains water or crystal water between layers and expands by heating.

The phyllosilicate hydrate having a grain diameter of 0.1 to 500 $\mu$m is usually used. The resin composition of the present invention using the phyllosilicate hydrate having an average grain diameter falling in the range described above is excellent particularly in a mechanical strength and holds a layer structure of the phyllosilicate hydrate, so that it provides a high fire resistant effect. The phyllosilicate hydrate has preferably an average grain diameter of 1 to 50 $\mu$m, more preferably 2 to 30 $\mu$m. A molded article obtained from the composition of the present invention using the phyllosilicate hydrate having such fine average grain diameter has an excellent gloss on a surface, and the grains of the phyllosilicate hydrate blended are not conspicuous on the surface of the molded article, so that the molded article presents an excellent appearance.

Further, moisture contained in the phyllosilicate hydrate is preferably maintained in kneading the composition and preferably vaporized well at temperatures at which the fire resistant effect is exhibited. Accordingly, the phyllosilicate hydrate in which a weight loss in heating from 200° C. up to 900° C. determined by thermogravimetric measurement (TG) is 2% or more, preferably 3 to 20% has a particularly excellent fire resistant effect and therefore is suitable.

Examples of such phyllosilicate hydrate include vermiculite, hydrobiotite and biotite hydrate, and vermiculite has a particularly high fire resistant effect and therefore is suitably used.

In order to control the phyllosilicate hydrate to the water content and the grain diameter each described above, known pulverizing and classifying methods can be employed.

Among them, a pulverizing method by impact using a hammer mill, a pin mill and a jet mill is preferred. Further good results can be obtained by pulverizing while maintaining a temperature of the pulverized grains at 80° C. or lower.

In the present invention, the blend amount of the phyllosilicate hydrate is 1 to 100 parts by weight, preferably 3 to 50 parts by weight per 100 parts by weight of the thermoplastic resin. If the blend amount of the phyllosilicate hydrate is smaller than 1 part by weight, the sufficient fire resistance is not obtained. On the other hand, if the blend amount exceeds 100 parts by weight, not only the fire resistant effect is not raised but also the surface appearance and the mechanical properties are reduced.

The fire resistant resin composition of the present invention may contain, if necessary, known additive components as well as the components described above as long as the effects of the present invention are not damaged. Examples thereof include anti-oxidants (phenol base, phosphite base and thioether base), weather resistant agents (benzophenone base, salicylate base, benzotriazole base and hindered amine base), metal deactivators, halogen-complementing agents, lubricants (olefins, fatty acids and derivatives thereof), crystallization nucleus agents (metal salts, talc and sorbitol base), fillers (talc, calcium carbonate, barium sulfate, glass fiber and mica), blooming inhibitors, anti-blocking agents, cloud inhibitors, adhesives, colorants, delustering agents, anti-static agents, absorbers for oxygen and carbon dioxide, gas adsorbents, freshness-holding agents, enzymes, deodorants and perfumes.

The fire resistant resin composition of the present invention is obtained by blending the raw material components and then mixing, melting and kneading them. A blending order and a kneading method of the respective components are not specifically restricted and can be carried out by conventional method by means of, for example, a tumbler type blender, a V type blender, a Hönschel mixer and ribbon mixer. Further, the melting and kneading method is not specifically restricted and can usually be carried out at temperatures higher than the melting point of the thermoplastic resin by means of a screw extruder, a banbury mixer and a mixing roll. This melting and kneading can be carried out under flow of inert gas such as nitrogen gas.

The fire resistant resin composition of the present invention which is blended with the non-halogen base flame retardant is less toxic in burning and has a high fire resistance. In addition thereto, it is excellent in terms of that the properties of the resin which is a base material is maintained well and the color tone is faint (pale yellow or pale red). Further, this excellent fire resistance is exhibited well even when the phyllosilicate hydrate has as small average grain diameter as falling in a range of 1 to 50 $\mu$m, and therefore the molded article which is excellent in gloss and appearance can be obtained.

Accordingly, the fire resistant resin composition of the present invention can be used for producing various molded articles in which a fire resistance is required. Examples of such molded articles include parts and covers of various electric appliances (laundry machines, refrigerators, tableware dryers, rice boilers, electric fans, ventilating fans, TV sets, personal computers, stereo sets, telephones, electric ovens, heating closets, irons and the like); parts and covers of heating equipments (air conditioners, stoves, hot plates, fan heaters, hot water supply machines and the like); interior materials and exterior materials for buildings; and parts and interior materials for automobiles, marine vessels and aircrafts.

The present invention shall more specifically be explained below with reference to examples and comparative examples, but the present invention shall by no means be restricted by these examples. In the examples and the comparative examples, measurements and tests were carried out by the following methods.

① Average Grain Diameter:

Measured in a solvent of methanol by means of SK LASER MICRON SIZER PRO-7000S manufactured by Seishin Enterprise Co., Ltd.

② Thermogravimetric Measurement:

A change in the weight of the phyllosilicate hydrate was determined by means of TG/DTA 2000 manufactured by Seiko Electric Ind. Co., Ltd., which was a differential thermal analysis/thermogravimetric measurement apparatus on the condition that the temperature was elevated at a heating rate of 40° C./minute between 30 to 950° C. under nitrogen flow of 200 ml/minute and the temperature was maintained at 950° C. for 10 minutes. In TG analysis, a reduced amount (shown by percentage) of the weight in a heating range from 200 to 900° C. was determined.

③ Flammability Test:

Flammabilities of a test piece having a length of 5 inches, a width of ½ inch and a thickness of ⅛ inch and a test piece having a length of 5 inches, a width of ½ inch and a thickness of 1/16 inch were judged by a vertical flammability test in accordance with UL 94 Standard.

④ Color Tone Test:

A test piece of 80 mm×47.5 mm×3 mm was molded by means of J50E-P manufactured by Nippon Seikosho Co., Ltd., and a color tone thereof was evaluated by visual observation.

⑤ Surface Appearance Test:

A test piece of 80 mm×47.5 mm×3 mm was molded by means of J50E-P manufactured by Nippon Seikosho Co., Ltd., and a surface appearance thereof was evaluated by visual observation. The results thereof were judged according to the following criteria:

○: well glossy and grains of blended matters can not be observed

Δ: well glossy but grains of blended matters can visually be observed x: inferior in glossiness and grains of blended matters can visually be observed as well Marks shown in the examples and comparative examples mean the following:

Thermoplastic Resins:

P1: Ethylene-propylene block copolymer [Tokuyama Polypro PN670G (Tokuyama Corporation)]

P2: Propylene homopolymer [Tokuyama Polypro PN150G (Tokuyama Corporation)]

P3: High density polyethylene [Suntech HD-J310 (Asahi Kasei Ind. Co., Ltd.)]

P4: Polystyrene [Estyrene G-20 (Nippon Steel Chemical Co., Ltd.)]

P5: ABS [Cycolack AM-11001 (Ube Cycon Co., Ltd.)]

P6: Polyamide resin [Novamide 1010 (Mitsubishi Engineering Plastics Co., Ltd.)]

P7: Polycarbonate [Panlite L-1225 (Teijin Kasei Co., Ltd.)]

Flame retardants:

R1: Melamine (heat absorption in decomposition=500 mJ/mg)

R2: Melamine sulfate (heat absorption in decomposition=400 mJ/mg)

R3: Melamine nitrate (heat absorption in decomposition=400 mJ/mg)

R4: Melamine borate (heat absorption in decomposition=400 mJ/mg)

R5: Melamine isocyanurate (heat absorption in decomposition=500 mJ/mg)

R6: Red phosphorus

R7: Triphenyl phosphate

R8: Ammonium phosphate (heat absorption in decomposition=500 mJ/mg)

R9: Butylamine phosphate (heat absorption in decomposition=500 mJ/mg)

R10: Ethylenediamine phosphate (heat absorption in decomposition=500 mJ/mg)

R11: Tiethyleneditetraamine phosphate (heat absorption in decomposition=500 mJ/mg)

R12: 1,2-Diaminocyclohexane phosphate (heat absorption in decomposition=500 mJ/mg)

R13: Melamine phosphate (heat absorption in decomposition=250 mJ/mg)

R14: Triazine phosphate (heat absorption in decomposition=400 mJ/mg)

R15: Amerine phosphate (heat absorption in decomposition=400 mJ/mg)

R16: Diaminomercaptotriazine phosphate (heat absorption in decomposition=400 mJ/mg)

R17: Diaminomethyltriazine phosphate (heat absorption in decomposition=400 mJ/mg)

R18: Diamiisopropoxytriazine phosphate (heat absorption in decomposition=400 mJ/mg)

R19: Benzoguanamine phosphate (heat absorption in decomposition=400 mJ/mg)

R20: Ammonium polyphosphate (heat absorption in decomposition=300 mJ/mg)

R21: Magnesium hydroxide

R22: Tetrazole ammonium salt (exothermic decomposition)

Phyllosilicate Hydrate:

V1: Vermiculite (non-baked product No. 0 produced in South Africa; average grain diameter=200 μm, weight loss in a heating range of from 200° C. up to 900° C.=5.7%)

V2: Vermiculite (obtained by crashing non-baked product No. 0 produced in South Africa by means of a hammer mill; average grain diameter=8 μm, weight loss in a heating range of from 200° C. up to 900° C.=4.8%)

Others:

F1: Talc (average grain diameter=5 μm)

F2: Calcium carbonate (average grain diameter=3 μm)

F3: Mica (average grain diameter=30 μm)

F4: Barium sulfate (average grain diameter=1 μm)

F5: Silicon resin (average grain diameter=1 aim)

F6: Silicon powder (average grain diameter=1 μm)

F7: Thermally expandable graphite (average grain diameter=500 μm)

F8: Crashed thermally expandable graphite (crashed thermally expandable graphite of F7; average grain diameter=10 μm)

EXAMPLES 1 to 58

Blended matters shown in the following Table 1 were further blended with 0.1 part by weight of 2,6-t-butyl-4-methylphenol (Stabilizer BHT manufactured by Sumitomo Chemical Ind. Co., Ltd.), 0.2 part by weight of dilaurylthio dipropionate (Stabilizer TPL-R manufactured by Sumitomo Chemical Ind. Co., Ltd.) and 0.1 part by weight of calcium stearate (manufactured by Dainippon Ink and Chemicals Inc.) and mixed by means of a Hönschel mixer. Strand-shaped articles were molded from the resulting fire resistant resin compositions by extruding at 185° C. by means of an extruding machine having a diameter of 30 mm equipped with a bent, and pellets were obtained by cutting them to about 5 mm after cooling in a water bath and drying. Next, the pellets described above were molded into various test pieces by means of a 50 to injection molding machine.

A flammability test, a color tone test and a surface appearance test were carried out with the respective fire resistant resin compositions. The results thereof are shown in Table 2.

TABLE 1

|  | Thermoplastic resin | Flame retardant containing no halogens | Phyllosilicate hydrate |
| --- | --- | --- | --- |
| Example 1  | P1: 100 parts by weight | R10: 20 parts by weight  | V1: 5 parts by weight |
| Example 2  | P1: 100 parts by weight | R10: 30 parts by weight  | V1: 15 parts by weight |
| Example 3  | P1: 100 parts by weight | R10: 80 parts by weight  | V1: 20 parts by weight |
| Example 4  | P1: 100 parts by weight | R10: 100 parts by weight | V1: 20 parts by weight |
| Example 5  | P1: 100 parts by weight | R1: 100 parts by weight  | V1: 20 parts by weight |
| Example 6  | P1: 100 parts by weight | R2: 100 parts by weight  | V1: 20 parts by weight |
| Example 7  | P1: 100 parts by weight | R3: 100 parts by weight  | V1: 20 parts by weight |
| Example 8  | P1: 100 parts by weight | R4: 100 parts by weight  | V1: 20 parts by weight |
| Example 9  | P1: 100 parts by weight | R5: 100 parts by weight  | V1: 20 parts by weight |
| Example 10 | P1: 100 parts by weight | R6: 100 parts by weight  | V1: 20 parts by weight |
| Example 11 | P1: 100 parts by weight | R7: 100 parts by weight  | V1: 20 parts by weight |
| Example 12 | P1: 100 parts by weight | R8: 50 parts by weight   | V1: 15 parts by weight |
| Example 13 | P1: 100 parts by weight | R9: 50 parts by weight   | V1: 15 parts by weight |
| Example 14 | P1: 100 parts by weight | R11: 50 parts by weight  | V1: 15 parts by weight |
| Example 15 | P1: 100 parts by weight | R12: 50 parts by weight  | V1: 15 parts by weight |
| Example 16 | P1: 100 parts by weight | R13: 50 parts by weight  | V1: 15 parts by weight |
| Example 17 | P1: 100 parts by weight | R14: 50 parts by weight  | V1: 15 parts by weight |
| Example 18 | P1: 100 parts by weight | R15: 50 parts by weight  | V1: 15 parts by weight |
| Example 19 | P1: 100 parts by weight | R16: 50 parts by weight  | V1: 15 parts by weight |
| Example 20 | P1: 100 parts by weight | R17: 50 parts by weight  | V1: 15 parts by weight |
| Example 21 | P1: 100 parts by weight | R18: 50 parts by weight  | V1: 15 parts by weight |
| Example 22 | P1: 100 parts by weight | R19: 50 parts by weight  | V1: 15 parts by weight |
| Example 23 | P1: 100 parts by weight | R20: 50 parts by weight  | V1: 15 parts by weight |
| Example 24 | P2: 100 parts by weight | R10: 30 parts by weight  | V1: 15 parts by weight |
| Example 25 | P3: 100 parts by weight | R10: 50 parts by weight  | V1: 15 parts by weight |
| Example 26 | P4: 100 parts by weight | R10: 80 parts by weight  | V1: 20 parts by weight |
| Example 27 | P5: 100 parts by weight | R10: 80 parts by weight  | V1: 20 parts by weight |
| Example 28 | P6: 100 parts by weight | R10: 25 parts by weight  | V1: 5 parts by weight |
| Example 29 | P7: 100 parts by weight | R10: 25 parts by weight  | V1: 5 parts by weight |
| Example 30 | P1: 100 parts by weight | R10: 20 parts by weight  | V2: 5 parts by weight |
| Example 31 | P1: 100 parts by weight | R10: 30 parts by weight  | V2: 15 parts by weight |
| Example 32 | P1: 100 parts by weight | R10: 80 parts by weight  | V2: 20 parts by weight |
| Example 33 | P1: 100 parts by weight | R10: 100 parts by weight | V2: 20 parts by weight |
| Example 34 | P1: 100 parts by weight | R1: 100 parts by weight  | V2: 20 parts by weight |
| Example 35 | P1: 100 parts by weight | R2: 100 parts by weight  | V2: 20 parts by weight |
| Example 36 | P1: 100 parts by weight | R3: 100 parts by weight  | V2: 20 parts by weight |
| Example 37 | P1: 100 parts by weight | R4: 100 parts by weight  | V2: 20 parts by weight |
| Example 38 | P1: 100 parts by weight | R5: 100 parts by weight  | V2: 20 parts by weight |
| Example 39 | P1: 100 parts by weight | R6: 100 parts by weight  | V2: 20 parts by weight |
| Example 40 | P1: 100 parts by weight | R7: 100 parts by weight  | V2: 20 parts by weight |
| Example 41 | P1: 100 parts by weight | R8: 50 parts by weight   | V2: 15 parts by weight |
| Example 42 | P1: 100 parts by weight | R9: 50 parts by weight   | V2: 15 parts by weight |
| Example 43 | P1: 100 parts by weight | R11: 50 parts by weight  | V2: 15 parts by weight |
| Example 44 | P1: 100 parts by weight | R12: 50 parts by weight  | V2: 15 parts by weight |
| Example 45 | P1: 100 parts by weight | R13: 50 parts by weight  | V2: 15 parts by weight |
| Example 46 | P1: 100 parts by weight | R14: 50 parts by weight  | V2: 15 parts by weight |
| Example 47 | P1: 100 parts by weight | R15: 50 parts by weight  | V2: 15 parts by weight |
| Example 48 | P1: 100 parts by weight | R16: 50 parts by weight  | V2: 15 parts by weight |
| Example 49 | P1: 100 parts by weight | R17: 50 parts by weight  | V2: 15 parts by weight |
| Example 50 | P1: 100 parts by weight | R18: 50 parts by weight  | V2: 15 parts by weight |
| Example 51 | P1: 100 parts by weight | R19: 50 parts by weight  | V2: 15 parts by weight |
| Example 52 | P1: 100 parts by weight | R20: 50 parts by weight  | V2: 15 parts by weight |
| Example 53 | P2: 100 parts by weight | R10: 30 parts by weight  | V2: 15 parts by weight |
| Example 54 | P3: 100 parts by weight | R10: 50 parts by weight  | V2: 15 parts by weight |
| Example 55 | P4: 100 parts by weight | R10: 80 parts by weight  | V2: 20 parts by weight |
| Example 56 | P5: 100 parts by weight | R10: 80 parts by weight  | V2: 20 parts by weight |
| Example 57 | P6: 100 parts by weight | R10: 25 parts by weight  | V2: 5 parts by weight |
| Example 58 | P7: 100 parts by weight | R10: 25 parts by weight  | V2: 5 parts by weight |

TABLE 2

| | Molda-bility | Flammability (1/8 inch) | Flammability (1/16 inch) | Color tone | Surface appearance |
|---|---|---|---|---|---|
| Example 1 | Good | V-0 | V-2 | Pale yellow | Δ |
| Example 2 | Good | V-0 | V-0 | Pale yellow | Δ |
| Example 3 | Good | V-0 | V-0 | Pale yellow | Δ |
| Example 4 | Good | V-0 | V-0 | Pale yellow | Δ |
| Example 5 | Good | V-2 | V-2 | Pale yellow | Δ |
| Example 6 | Good | V-2 | V-2 | Pale yellow | Δ |
| Example 7 | Good | V-2 | V-2 | Pale yellow | Δ |
| Example 8 | Good | V-2 | V-2 | Pale yellow | Δ |
| Example 9 | Good | V-2 | V-2 | Pale yellow | Δ |
| Example 10 | Good | V-0 | V-0 | Pale red | Δ |
| Example 11 | Good | V-2 | V-2 | Pale yellow | Δ |
| Example 12 | Good | V-0 | V-0 | Pale yellow | Δ |
| Example 13 | Good | V-0 | V-0 | Pale yellow | Δ |
| Example 14 | Good | V-0 | V-0 | Pale yellow | Δ |
| Example 15 | Good | V-0 | V-0 | Pale yellow | Δ |
| Example 16 | Good | V-0 | V-0 | Pale yellow | Δ |
| Example 17 | Good | V-0 | V-0 | Pale yellow | Δ |
| Example 18 | Good | V-0 | V-0 | Pale yellow | Δ |
| Example 19 | Good | V-0 | V-0 | Pale yellow | Δ |
| Example 20 | Good | V-0 | V-0 | Pale yellow | Δ |
| Example 21 | Good | V-0 | V-0 | Pale yellow | Δ |
| Example 22 | Good | V-0 | V-0 | Pale yellow | Δ |
| Example 23 | Good | V-0 | V-0 | Pale yellow | Δ |
| Example 24 | Good | V-0 | V-0 | Pale yellow | Δ |
| Example 25 | Good | V-0 | V-0 | Pale yellow | Δ |
| Example 26 | Good | V-2 | V-2 | Pale yellow | Δ |
| Example 27 | Good | V-2 | V-2 | Pale yellow | Δ |
| Example 28 | Good | V-0 | V-0 | Pale yellow | Δ |
| Example 29 | Good | V-0 | V-0 | Pale yellow | Δ |
| Example 30 | Good | V-0 | V-2 | Pale yellow | ◯ |
| Example 31 | Good | V-0 | V-0 | Pale yellow | ◯ |
| Example 32 | Good | V-0 | V-0 | Pale yellow | ◯ |
| Example 33 | Good | V-0 | V-0 | Pale yellow | ◯ |
| Example 34 | Good | V-2 | V-2 | Pale yellow | ◯ |
| Example 35 | Good | V-2 | V-2 | Pale yellow | ◯ |
| Example 36 | Good | V-2 | V-2 | Pale yellow | ◯ |
| Example 37 | Good | V-2 | V-2 | Pale yellow | ◯ |
| Example 38 | Good | V-2 | V-2 | Pale yellow | ◯ |
| Example 39 | Good | V-0 | V-0 | Pale red | ◯ |
| Example 40 | Good | V-2 | V-2 | Pale yellow | ◯ |
| Example 41 | Good | V-0 | V-0 | Pale yellow | ◯ |
| Example 42 | Good | V-0 | V-0 | Pale yellow | ◯ |
| Example 43 | Good | V-0 | V-0 | Pale yellow | ◯ |
| Example 44 | Good | V-0 | V-0 | Pale yellow | ◯ |
| Example 45 | Good | V-0 | V-0 | Pale yellow | ◯ |
| Example 46 | Good | V-0 | V-0 | Pale yellow | ◯ |
| Example 47 | Good | V-0 | V-0 | Pale yellow | ◯ |
| Example 48 | Good | V-0 | V-0 | Pale yellow | ◯ |
| Example 49 | Good | V-0 | V-0 | Pale yellow | ◯ |
| Example 50 | Good | V-0 | V-0 | Pale yellow | ◯ |
| Example 51 | Good | V-0 | V-0 | Pale yellow | ◯ |
| Example 52 | Good | V-0 | V-0 | Pale yellow | ◯ |
| Example 53 | Good | V-0 | V-0 | Pale yellow | ◯ |
| Example 54 | Good | V-0 | V-0 | Pale yellow | ◯ |
| Example 55 | Good | V-2 | V-2 | Pale yellow | ◯ |
| Example 56 | Good | V-2 | V-2 | Pale yellow | ◯ |
| Example 57 | Good | V-0 | V-0 | Pale yellow | ◯ |
| Example 58 | Good | V-0 | V-0 | Pale yellow | ◯ |

COMPARATIVE EXAMPLES 1 to 13

The same procedure as in Example 1 was repeated, except that blended matters shown in Table 3 were substituted for the blended matters shown in Table 1 described above. The results thereof are shown in Table 4.

TABLE 3

|  | Thermoplastic resin | Flame retardant containing no halogens | Others |
|---|---|---|---|
| Comparative Example 1 | P1: 100 parts by weight | R10: 30 parts by weight | — |
| Comparative Example 2 | P1: 100 parts by weight | R21: 30 parts by weight | V1: 15 parts by weight |
| Comparative Example 3 | P1: 100 parts by weight | R22: 30 parts by weight | V1: 15 parts by weight |
| Comparative Example 4 | P1: 100 parts by weight | R10: 350 parts by weight | V1: 20 parts by weight |
| Comparative Example 5 | P1: 100 parts by weight | R10: 30 parts by weight | F1: 15 parts by weight |
| Comparative Example 6 | P1: 100 parts by weight | R10: 30 parts by weight | F2: 15 parts by weight |
| Comparative Example 7 | P1: 100 parts by weight | R10: 30 parts by weight | F3: 15 parts by weight |
| Comparative Example 8 | P1: 100 parts by weight | R10: 30 parts by weight | F4: 15 parts by weight |
| Comparative Example 9 | P1: 100 parts by weight | R10: 30 parts by weight<br>R21: 15 parts by weight |  |
| Comparative Example 10 | P1: 100 parts by weight | R10: 30 parts by weight | F5: 15 parts by weight |
| Comparative Example 11 | P1: 100 parts by weight | R10: 30 parts by weight | F6: 15 parts by weight |
| Comparative Example 12 | P1: 100 parts by weight | R10: 30 parts by weight | F7: 15 parts by weight |
| Comparative Example 13 | P1: 100 parts by weight | R10: 30 parts by weight | F8: 15 parts by weight |

TABLE 4

|  | Molda-bility | Flammability | | Color tone | Surface appearance |
|---|---|---|---|---|---|
|  |  | (1/8 inch) | (1/16 inch) |  |  |
| Comparative Example 1 | Good | HB | HB | Pale yellow | ○ |
| Comparative Example 2 | Good | HB | HB | Pale yellow | Δ |
| Comparative Example 3 | Good | HB | HB | Pale yellow | Δ |
| Comparative Example 4 | Impossible to pelletize | — | — | — | — |
| Comparative Example 5 | Good | HB | HB | White | ○ |
| Comparative Example 6 | Good | HB | HB | White | ○ |
| Comparative Example 7 | Good | HB | HB | White | ○ |
| Comparative Example 8 | Good | HB | HB | White | ○ |
| Comparative Example 9 | Good | HB | HB | White | ○ |
| Comparative Example 10 | Good | HB | HB | White | ○ |
| Comparative Example 11 | Good | HB | HB | White | ○ |
| Comparative Example 12 | Good | V-0 | V-2 | Black | X |
| Comparative Example 13 | Good | HB | HB | Black | ○ |

What is claimed is:

1. A fire resistant resin composition having fire resistance as high as V-0 or more in a vertical flammability test in accordance with UL94 Standard, which comprises 100 parts by weight of a thermoplastic resin (I), 10 to 300 parts by weight of at least one flame retardant (II) selected from the group consisting of a nitrogen base flame retardant having no halogen atoms, a phosphorus base flame retardant having no halogen atoms and a nitrogen-phosphorus base flame retardant having no halogen atoms, and 1 to 100 parts by weight of phyllosilicate hydrate (III), wherein the phyllosilicate hydrate has a grain diameter of 1 to 50 μm and a weight loss of 2% or more in heating from 200° C. up to 900° C. which is determined according to thermogravimetric measurement (TG).

2. The fire resistant resin composition as described in claim 1, wherein the thermoplastic resin is polyolefin.

3. The fire resistant resin composition as described in claim 1, wherein the nitrogen base flame retardant having no halogen atoms is at least one member selected from the group consisting of triazine compounds, aliphatic amine compounds, sulfates of triazine compounds, sulfates of aliphatic amine compounds, nitrates of triazine compounds, nitrates of aliphatic amine compounds, borates of triazine compounds, borates of aliphatic amine compounds, isocyanurates of triazine compounds and isocyanurates of aliphatic amine compounds.

4. The fire resistant resin composition as described in claim 3, wherein the triazine compound is a compound represented by the following formula:

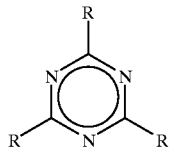

wherein a plurality of R is hydrogen, an alkyl group, an aryl group, an amino group, a hydroxyl group, an alkoxy group or a mercapto group which may be the same as or different from each other.

5. The fire resistant resin composition as described in claim 3, wherein the aliphatic amine compound is represented by the following formula:

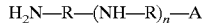

wherein a plurality of R is an alkylene group or a cycloalkylene group which may be the same as or different from each other; A is hydrogen or an amino group; and n is an integer of 0 to 5.

6. The fire resistant resin composition as described in claim 1, wherein the phosphorus base flame retardant having no halogen atoms is a phosphorus, a phosphate or a polyphosphate.

7. The fire resistant resin composition as described in claim 1, wherein the nitrogen-phosphorus base flame retardant is at least one compound selected from a phosphate of an aliphatic amine compound, a polyphosphate of an aliphatic amine compound, a phosphate of a triazine compound, a polyphosphate of a triazine compound, ammonium phosphate and ammonium polyphosphate.

8. The fire resistant resin composition as described in claim 1, wherein the nitrogen-phosphorus base flame retardant is a phosphate or a polyphosphate of a triazine compound represented by the following formula:

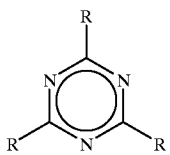

wherein a plurality of R is hydrogen, an alkyl group, an aryl group, an amino group, a hydroxyl group, an alkoxy group or a mercapto group which may be the same as or different from each other.

9. The fire resistant resin composition as described in claim 1, wherein the nitrogen-phosphorus base flame retardant is a phosphate or a polyphosphate of an aliphatic amine compound represented by the following formula:

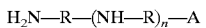

wherein a plurality of R is an alkylene group or a cycloalkylene group which may be the same as or different from each other; A is hydrogen or an amino group; and n is an integer of 0 to 5.

10. The fire resistant resin composition as described in claim 1, wherein the phyllosilicate hydrate is vermiculite.

\* \* \* \* \*